US012583534B2

(12) United States Patent
Martino

(10) Patent No.: US 12,583,534 B2
(45) Date of Patent: Mar. 24, 2026

(54) VEHICLE WITH A DIFFUSER MOUNTED THRUSTER

(71) Applicant: Marc Gregory Martino, Westlake Village, CA (US)

(72) Inventor: Marc Gregory Martino, Westlake Village, CA (US)

( * ) Notice: Subject to any disclaimer, the term of this patent is extended or adjusted under 35 U.S.C. 154(b) by 894 days.

(21) Appl. No.: 17/818,327

(22) Filed: Aug. 8, 2022

(65) Prior Publication Data

US 2023/0044790 A1 Feb. 9, 2023

Related U.S. Application Data

(60) Provisional application No. 63/260,103, filed on Aug. 9, 2021.

(51) Int. Cl.
B62D 37/02 (2006.01)
B62D 35/02 (2006.01)

(52) U.S. Cl.
CPC ............. B62D 37/02 (2013.01); B62D 35/02 (2013.01)

(58) Field of Classification Search
CPC ................................ B62D 35/02; B62D 37/02
See application file for complete search history.

(56) References Cited

U.S. PATENT DOCUMENTS

| | | | | |
|---|---|---|---|---|
| 3,952,823 A | * | 4/1976 | Hinderks | F01N 13/082 |
| | | | | 296/180.1 |
| 9,688,321 B2 | * | 6/2017 | Dominguez | B62D 35/02 |
| 9,957,000 B1 | * | 5/2018 | Ehirim | B62D 35/007 |
| 11,390,335 B2 | * | 7/2022 | Thomas | B62D 35/007 |
| 2020/0207429 A1 | * | 7/2020 | Favaretto | B62D 37/02 |
| 2024/0092435 A1 | * | 3/2024 | Chue | B62D 37/00 |

FOREIGN PATENT DOCUMENTS

WO    WO-2007096549 A2 *  8/2007  ............. B62D 35/02

* cited by examiner

*Primary Examiner* — Valentin Neacsu
*Assistant Examiner* — Hosam Shabara
(74) *Attorney, Agent, or Firm* — Orbit IP

(57) ABSTRACT

A wheeled vehicle includes a diffuser affixed directly or indirectly to a frame or formed as part of the frame. The diffuser defines a tunnel-shaped void disposed at a bottom of the vehicle open to the ground surface below. The tunnel starts at a proximal end with a first height and increases to a second height closer to the rear portion. A distal end of the diffuser is open to the rear portion. A thruster is affixed directly or indirectly to the frame, the thruster having an exhaust outlet disposed at, near or within the diffuser aimed at the tunnel-shaped void. The exhaust outlet is disposed a distance away from the distal end of the diffuser, wherein the exhaust outlet is configured to introduce a moving airstream into the diffuser thereby increasing downforce of the wheeled vehicle generated by the diffuser while wheeled vehicle is stationary or moving.

20 Claims, 5 Drawing Sheets

VEHICLE WITH A DIFFUSER MOUNTED THRUSTER

CROSS-REFERENCE TO RELATED APPLICATIONS

This application claims priority to provisional patent application No. 63/260,103, filed Aug. 9, 2021, the entire contents of which are hereby incorporated in full by this reference.

DESCRIPTION

Field of the Invention

This invention relates to thrusters used in automobiles or any wheeled vehicle. More specifically, this invention relates to placing a thruster at the beginning of a diffuser to gain a dual benefit of increased thrust and increased downforce.

Background of the Invention

FIG. 1 of the '103 provisional application shows a side view of a typical sports car with a diffuser. A diffuser is a tunnel shaped structure on the bottom rear of a car that usually starts out with zero height and then moves to a maximum height at the rear of the car. Diffusers are open to the bottom, allowing air to rush within from the around the car when the car is in motion. Diffusers are typically formed at either sides of the transmission and driveshafts of a traditional car layout utilizing a combustion engine. There-fore, there may be one, two or numerous diffusers in any such car design.

The key role of the diffuser on a modern racecar is to accelerate the flow of air under the car, creating an area of low pressure, thus increasing downforce. What this actually means in real world terms is that the shaped piece of bodywork at the rear of a car draws the air out from under the car. This literally sucks the car to onto the track/road creating much higher grip levels than would otherwise be available simply through the tires and suspension setup. This is known as aerodynamic grip.

To understand why this works, one first has to have a grasp of the basic principles of lift and down force in relation to a wing used on a race car. Note, this is the opposite of how a wing for an airplane works as the wing profile is reversed. The air passing under the race car wing has further to travel than the air passing over the top surface. This causes the air under the wing to accelerate, resulting in a drop in air pressure, this creates a difference in pressure between the upper and lower surfaces. This difference essentially means the wing is pushed down by the higher pressure above, generating what is known as downforce.

Beyond wings, an extreme application of downforce can be seen on the Chaparral 2J car as illustrated in the '130 provisional application. A pair of fans on the rear of the car sucked the air from under the floor, pulling it onto the road, rather like a reversed hovercraft.

With this in mind, the role of the diffuser on a racing car is to speed the airflow up underneath the car, reducing its pressure, creating a greater difference in pressure between the upper and lower surfaces of the car. This means more downforce and aerodynamic grip, allowing the car to corner faster and brake harder. Now that we understand the basics of downforce generation we can look at the more detailed operation of a diffuser, and why they have their distinctive form.

The diffuser increases in volume along its length, creating a void that has to be filled by the air passing under the body. This venturi effect means that the flow is accelerated through the throat of the diffuser, creating the desired low pressure, then gradually returned to the same velocity at which it joined the wake. The angle or slope of the diffuser is also important, the diffuser must have a gradual change of angle to prevent flow separation from its roof and sides.

Another example of a car utilizing a rearward disposed rotating fan is the T.50 from Gordan Murray Automotive as illustrated in the '130 provisional application. Here, a large fan is disposed above the diffuser at the rear of the car. The diffuser sucks air at the top surface of the diffuser allowing a stepper diffuser angle to be utilized for more downforce. It is important to note that all of these prior art fan designs are placed at the top and/or rear of the car—this will be in contrast to the present invention.

At the same time, some car companies and racecar designers have contemplated using thrusters to propel their vehicles forward or to the side during cornering. Usually, these thrusters are placed at the rear of the car to provide thrust forward. These thrusters may be cold thrusters, which mean they are using a compressed gas such as releasing compressed air to generate thrust. Alternatively, one could use an explosive combustible fuel for such a thruster, but it could burn things that were directly behind the car. Thus, the cold air thruster seems like a safer option.

Unfortunately, compressed air doesn't have the same mass as a hot gas thruster burning a combustible fuel. Therefore, the power generated by the cold thruster is significantly less than the hot gas thruster. Also, the cold air thruster must store compressed air within an air tank. This air tank is heavy and large taking up significant space. Once the tank is depleted, it will take much time to refill and repressurize the tank. Therefore, this solution may be too heavy and possibly not capable of sustained performance. However, the present invention will work with any type of thruster, whether it is hot or cold.

SUMMARY OF THE INVENTION

An embodiment of the present invention is a wheeled vehicle 10, comprising: a frame 12 configured for support-ing a driver and/or a plurality of mechanical devices, wherein the frame is defined as having a front portion 14, a rear portion 16, a vertical cross plane 18, a right portion 20, a left portion 22, and a vertical center plane 24, wherein the front portion is opposite the rear portion and is generally divided by the vertical cross plane, and wherein the right portion is opposite the left portion and is generally divided by the vertical center plane; a pair of steerable front wheels 26 rotatably affixed to the frame positioned at opposite sides of the front portion generally equally separated by the vertical center plane, and wherein the pair of steerable front wheels rotate in both a pair of rolling axes 28 and a pair of turning axes 30, wherein the pair of rolling axes allow the pair of steerable front wheels to roll upon a surface 31 wherein the surface is substantially perpendicular to both the vertical center plane and the vertical cross plane, wherein the pair of rolling axes are substantially parallel with the sur-face, and wherein the pair of turning axes are substantially parallel to both the vertical center plane and the vertical cross plane, wherein the driver or the plurality of mechanical devices are configured to change direction of the pair of steerable front wheels relative to the orientation of the frame about the pair of turning axes through a steering input; at least one rear wheel 32 rotatably affixed to the frame generally positioned about the rear portion behind the vertical cross plane, wherein the at least one rear wheel rotates in a rear rolling axis 34 wherein the rear rolling axis is substantially parallel to the vertical cross plane and substantially perpendicular to the vertical center plane, such that the rear wheel can roll upon the surface; a motor 36 affixed to the frame configured to power at least one of the pair of steerable front wheels and/or the at least one rear wheel; a diffuser 38 affixed directly or indirectly to the frame or formed as part of the frame, the diffuser defining a tunnel-shaped void 40 (ramp-shaped, wedge-shaped) disposed at a bottom 42 of the vehicle and open to the surface, the tunnel starting at a proximal end 44 with a first height 46 nearer to the front portion and increasing to a second height 48 closer to the rear portion, wherein a distal end 50 of the diffuser is open to the rear portion; and a thruster 52 affixed directly or indirectly to the frame, the thruster having an exhaust outlet 54, wherein the exhaust outlet is disposed at, near or within the diffuser aimed at the tunnel-shaped void, wherein the exhaust outlet is disposed a distance 56 away from the distal end of the diffuser, wherein the exhaust outlet is configured to introduce a moving airstream 58 into the diffuser thereby increasing downforce of the wheeled vehicle generated by the diffuser while wheeled vehicle is stationary or moving.

In another embodiment, the thruster may be a cold gas thruster. The cold gas thruster may be powered by a compressed gas stored in a pressurized tank 60.

In another embodiment, the thruster may be a hot gas thruster. The hot gas thruster may be powered by a combustible fuel 62 stored in a fuel tank 64. The thruster may be a combustible fuel powered turbine engine 52.

The thruster may be an electric motor powered turbine. The electric motor powered turbine is powered by electricity stored in a battery 66a or capacitor 66b.

In one embodiment the exhaust outlet is disposed ahead of the at least one rear tire.

In one embodiment the exhaust outlet is disposed ahead of the pair of steerable front wheels.

In one embodiment the exhaust outlet is disposed ahead of the vertical cross plane.

In one embodiment the exhaust outlet is disposed ahead of the at least one rear tire and behind the pair of steerable front wheels.

In one embodiment the exhaust outlet is aimed directly parallel to the surface.

In one embodiment the exhaust outlet is aimed at an angle upwards relative to the surface.

In one embodiment a shield plate 70 is disposed below the exhaust outlet and/or the thruster.

In one embodiment a heat resistant coating or heat shield is disposed on at least one external surface of the diffuser.

DETAILED DESCRIPTION OF THE PREFERRED EMBODIMENTS

Figure 12:
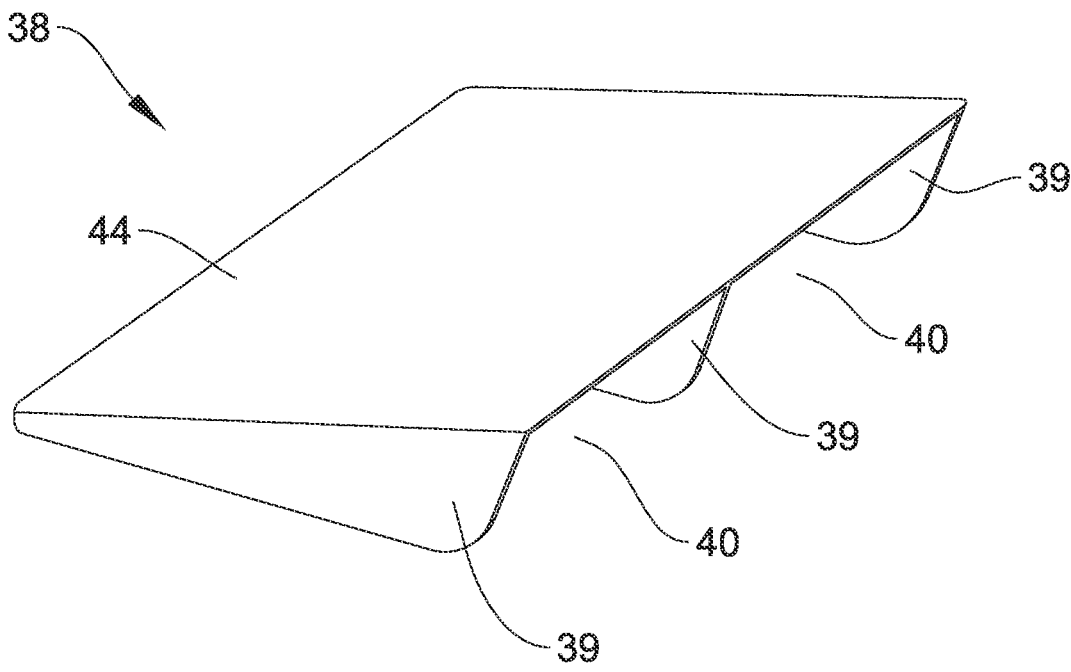
FIG. 12 is an isometric view of a universal diffuser that is mountable to the bottom of a vehicle.
Figure 13:
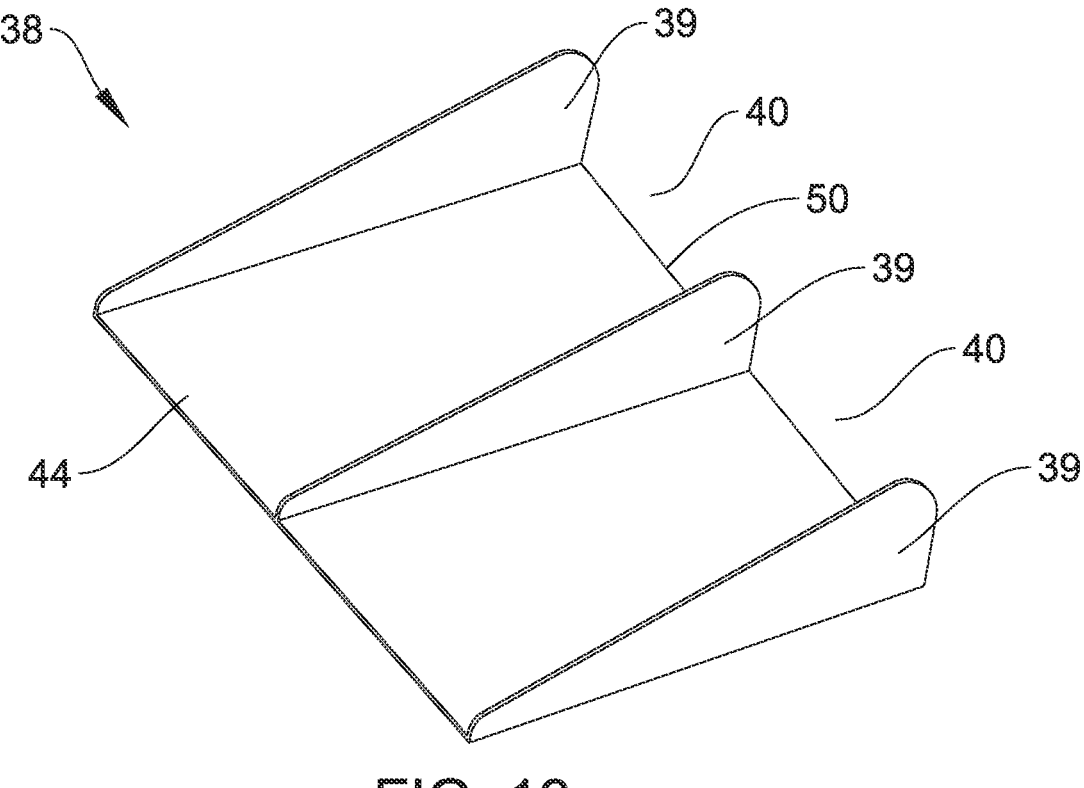
FIG. 13 is another isometric view of the structure of FIG. 12 now showing a bottom side of the universal diffuser.

FIGS. 12 and 13 shows the shape of a standard/universal diffuser 38 that is configured to be mounted to the bottom of a wheeled vehicle. FIGS. 12 and 13 help the reader understand the shape being described in the rest of the figures. It is understood that this embodiment has three fins 39, but could be any number of fins such as 1, 2, 3, 4, 5, 6 or any "n" number of diffusers. Furthermore, diffuser shapes similar to the one shown here can be integrated into the bottom body work of a vehicle, such that they are an integrally formed part of the vehicle.

Figures 6, 7, 8:
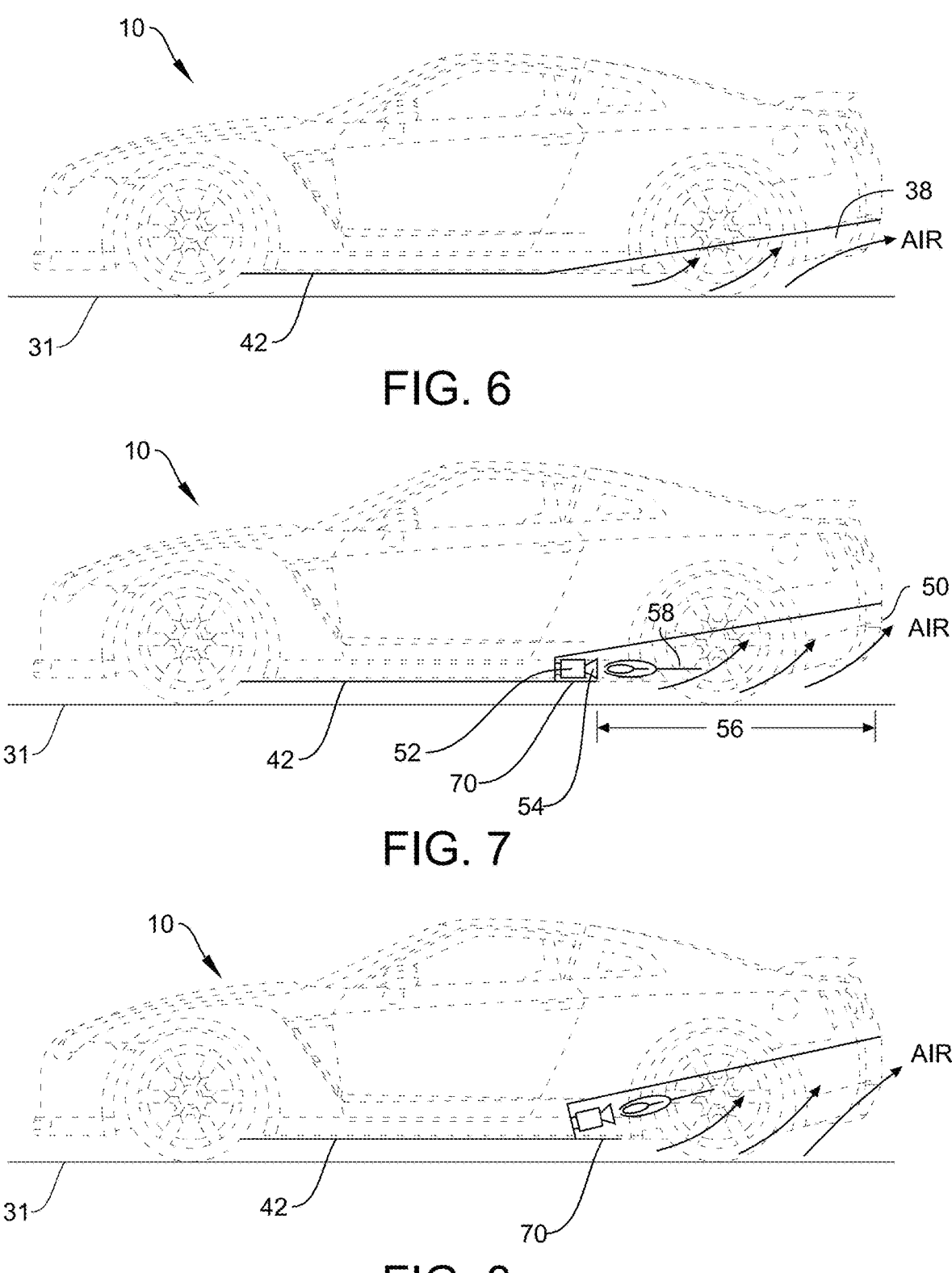
FIG. 6 is a side view of a vehicle similar to FIG. 1 showing a diffuser placement.
FIG. 7 is an embodiment of the present invention of a thruster working in cooperation with the diffuser for increased performance.
FIG. 8 is another embodiment of the present invention of a thruster working in cooperation with the diffuser for increased performance.

FIG. 6 is a side view showing the diffuser 38 as part of the vehicle 10 and how it fits and works in relation to the vehicle. The length of the diffuser can be different for different vehicles. Likewise, the width of the diffuser may also be straight, narrowed or widened as it moves from front to back along the vehicle. Specific diffuser designs are usually heavily influenced by the particular vehicle it is being integrated with, as mechanical and functional constraints may limit its final design. It is understood by those skilled in the art that a wide variety of diffuser shapes and designs are possible and that this teaching is not limited to a specific embodiment taught or suggested herein.

Now turning to the present invention, the inventor has a simple but novel solution as shown in FIGS. 3-11. The diffuser can be designed to house a hot gas thruster, cold gas thruster or any thruster design, near the beginning (away from the end of the diffuser) of the diffuser disposed at the bottom of the car. There are several advantages to this design that the prior art failed to realize.

First, all types of thrusters can be utilized, whether they are cold thrusters using pressurized gas or hot thrusters burning a combustible fuel. Additionally, even small turbine jet engines can be located at the beginning of the diffuser. If a hot gas thruster or gas turbine is used, the advantage is that hot air being expelled at quick velocities will mix with the surrounding air such that by the time it leaves the back end of the car it is at a safe temperature such that objects and people directly behind are not injured. This now safely allows the use of hot gas thrusters (in comparison to cold thrusters) which produce more power and can even utilize the same combustible fuel as an internal combustion engine that may be running if designed or desired.

The second advantage is that the severity of the upward slope of the diffuser itself can be increased to increase downforce as now air separation from the upper diffuser surface can be eliminated.

The third advantage is that the vehicle can even make a significant amount of downforce at zero speed. For example, during a launch of a vehicle from zero miles per hour, there is literally no downforce acting on the car such that the tires only have as much grip as their stickiness and car weight will allow. Now, with the Applicant's invention, the thruster can be activated to increase grip while also providing forward thrust, thus allowing the engine to maximize its grip through the tires and again result in a quicker acceleration. This is a win-win scenario where the vehicle has more grip to put the power down and more additional thrust from the thruster.

To increase grip during a launch of the vehicle from a standstill, the thruster may be activated at least a short time before the car begins to accelerate forward. Enough time should elapse such that air is being drawn under the car to create a vacuum/suction affect. This time may be from half a second to more, such as a few seconds. Thus, the thruster may be desirably activated 0.5, 1, 1.5, 2, 2.5 or 3 seconds before the vehicle attempts to move forward under wheel power. It is noted that when the thruster start, the tires and braking system will actually be preventing the vehicle from moving forward until the car attempts to accelerate forward under engine and/or motor power.

The fourth advantage is that varying levels of thrust are possible to perform different functions. For example, a smaller amount of thrust can be used to keep the air from separating from the upper surface of the diffuser to increase downforce. Then, if you want maximum thrust, the thruster can be turned up to full power for massive increases in acceleration from the additional thrust of the thruster.

The fifth advantage is that the thruster is below the car and/or disposed within the diffuser. If a catastrophic failure of the thruster was to occur, the thruster would simply explode downwards into the ground. To accommodate such safety, the diffuser itself would be designed to withstand explosive forces and to also withstand the heat generated by the thruster. For example, a heat resistive material should be used for the diffuser such as heat resistive panels prevent heat from heat soaking the rest of the car's frame and structure. Therefore, the diffuser will need to be specially designed to work in conjunction with a hot gas thruster.

Figure 1:
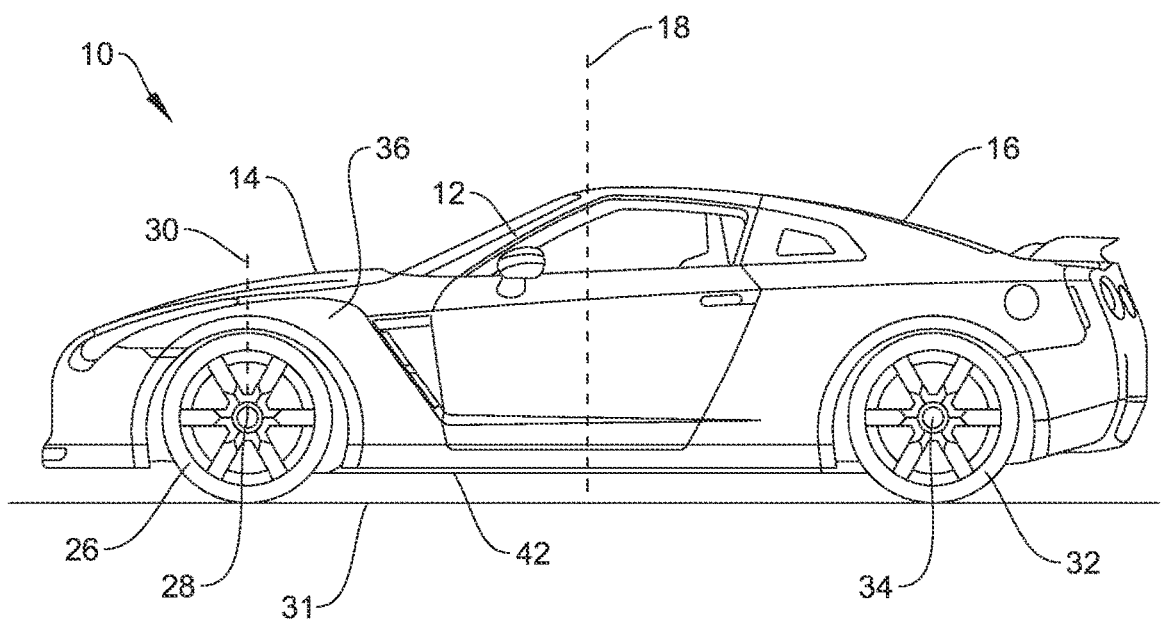
FIG. 1 is a side view of a vehicle, typically a sports car or race car.
Figure 2:
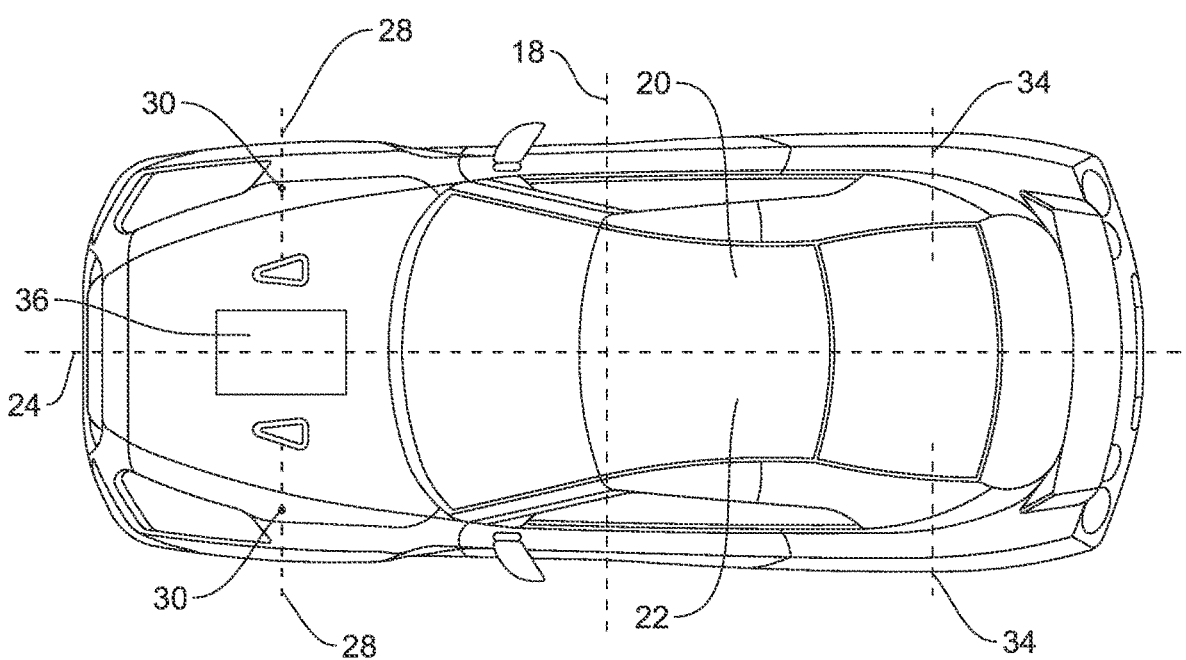
FIG. 2 is a top view of the vehicle of FIG. 1.

FIGS. 1 and 2 show a wheeled vehicle 10, comprising a frame 12 configured for supporting a driver and/or a plurality of mechanical devices. The driver is typically seated in a car seat and the plurality of mechanical devices are the engine, transmission, suspension, steering and the like. The frame can be a tube type frame where body panels are attached thereto, or the frame can be a unibody construction that forms part of the body and the frame at the same time.

The frame is defined as having a front portion 14, a rear portion 16, a vertical cross plane 18, a right portion 20, a left portion 22, and a vertical center plane 24. The front portion is opposite the rear portion and is generally divided by the vertical cross plane. The right portion is opposite the left portion and is generally divided by the vertical center plane.

A pair of steerable front wheels 26 are rotatably affixed to the frame positioned at opposite sides of the front portion generally equally separated by the vertical center plane. The pair of steerable front wheels rotate in both a pair of rolling axes 28 and a pair of turning axes 30. The pair of rolling axes allow the pair of steerable front wheels to roll upon a surface 31 wherein the surface is substantially perpendicular to both the vertical center plane and the vertical cross plane. The pair of rolling axes are substantially parallel with the surface, but may be angled slightly to account for camber, caster and toe. The pair of turning axes are substantially parallel to both the vertical center plane and the vertical cross plane, but may be angled slightly to account for camber, caster and toe. The driver or the plurality of mechanical devices (i.e., self-driving vehicle) are configured to change direction of the pair of steerable front wheels relative to the orientation of the frame about the pair of turning axes through a steering input.

At least one rear wheel 32 is rotatably affixed to the frame generally positioned about the rear portion behind the vertical cross plane. The at least one rear wheel rotates in a rear rolling axis 34 wherein the rear rolling axis is substantially parallel to the vertical cross plane and substantially perpendicular to the vertical center plane, again considering slight angle variations which may be made to account for camber, caster and toe. Now, the rear wheel can roll upon the surface.

A motor 36 is affixed to the frame configured to power at least one of the pair of steerable front wheels and/or the at least one rear wheel. The motor may be any internal combustion engine or may be an electric motor. There is literally a multitude type of powerplants being developed to power the vehicle as this teaching is not limited to any one particular type.

Figure 3:
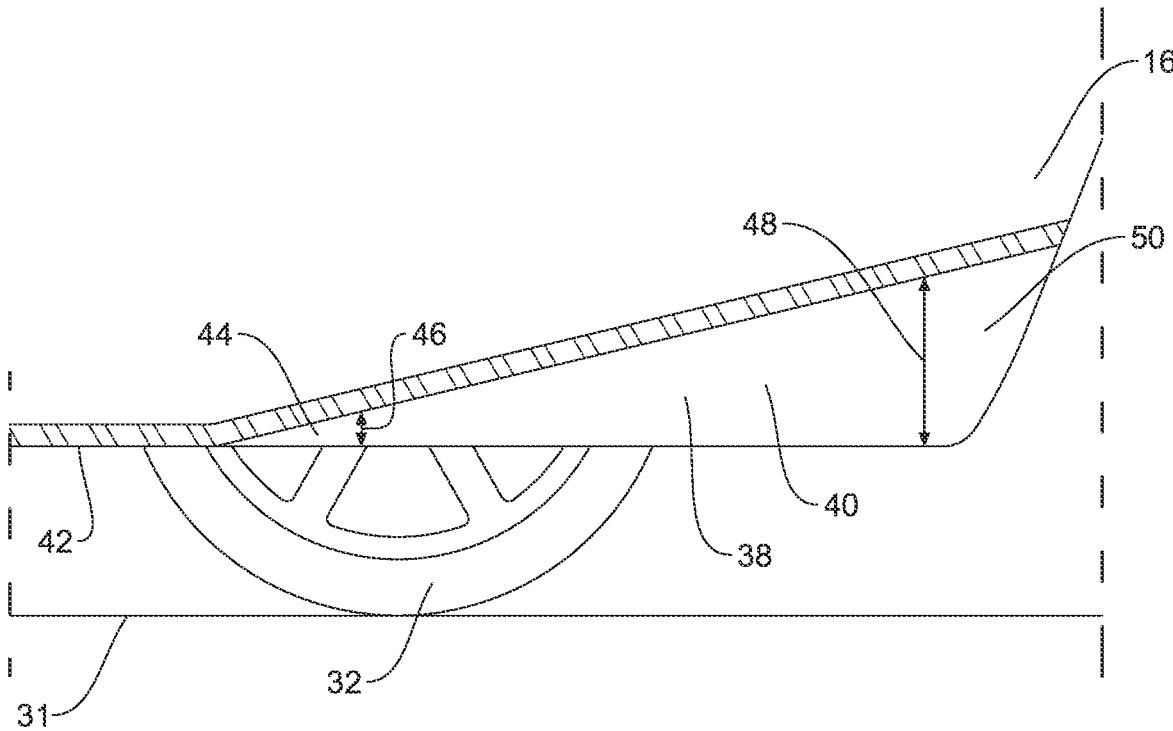
FIG. 3 is an enlarged sectional view of the rear of the vehicle of FIG. 1 illustrating a diffuser.

Now turning to FIG. 3, which is a sectional view about the rear of the vehicle, a diffuser 38 is affixed directly or indirectly to the frame or formed as part of the frame. This diffuser is similar to that shown and described in FIGS. 12-13. The diffuser defines a tunnel-shaped void 40 (ramp-shaped, wedge-shaped) disposed at a bottom 42 of the vehicle and is open to the surface 31. The tunnel of the diffuser starts at a proximal end 44 with a first height 46 nearer to the front portion and increasing to a second height 48 closer to the rear portion, wherein a distal end 50 of the diffuser is open to the rear portion of the vehicle such that air can exit behind.

Figure 4:
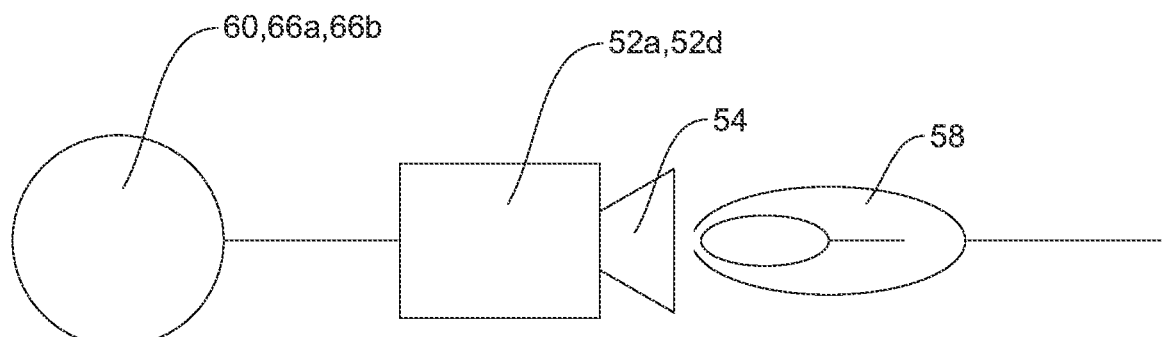
FIG. 4 is a simplified schematic of a thruster embodiment.

FIG. 4 is a simplified schematic view of a thruster, where the thruster is a cold gas thruster 52a. The thruster has an exhaust 54 such that it expels air/combustible fuels 58 at an increased velocity. The cold gas thruster may be powered by a compressed gas stored in a pressurized tank 60. The thruster could be an electric fan 52d that is powered by electricity stored in a battery 66a or capacitor 66b.

Figure 5:
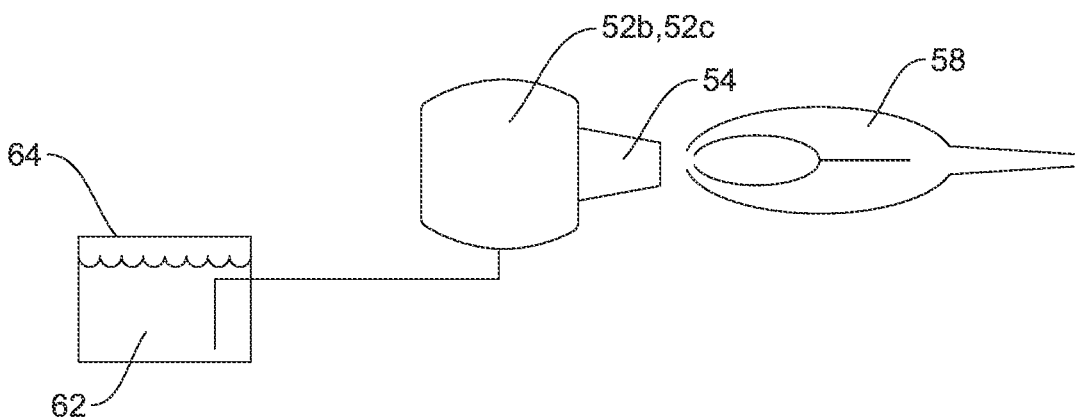
FIG. 5 is another simplified schematic of a thruster embodiment.

FIG. 5 is a simplified schematic view of a thruster 52, where the thruster may be a hot gas thruster 52b or a turbine engine 52c. The thrusters may be powered by a combustible fuel 62 stored in a fuel tank 64.

FIG. 7 now shows the present invention where a thruster 52 is affixed directly or indirectly to the frame. The thruster has an exhaust outlet 54, wherein the exhaust outlet is disposed at, near or within the diffuser aimed at the tunnel-shaped void 40. The exhaust outlet is disposed a distance 56 away from the distal end of the diffuser, wherein the exhaust outlet is configured to introduce a moving airstream 58 into the diffuser thereby increasing downforce of the wheeled vehicle generated by the diffuser while wheeled vehicle is stationary and/or moving. In practice, the distance 56 would at least be 1 foot. Realistically, the distance 56 would be at least 2, 3, 4, 5, 6, 7, 8, 9 or 10 feet away. In other embodiments shown herein, the distance 56 could extend the entire length of the vehicle.

As shown in FIG. 7, a shield plate 70 prevents rocks and other debris from making contact with the thruster and exhaust, as these parts may be easily damaged.

As shown in FIG. 8, exhaust outlet 54 is aimed at an angle upwards relative to the surface. This causes the airstream 58 to follow the contour of the diffuser to a greater degree.

Optionally, the thruster may be able to mechanically pivot by servos and actuators to either be pointed straight reward as in FIG. 7 or at an angle as in FIG. 8.

As shown in FIGS. 8 and 7, the exhaust outlet is disposed ahead of the at least one rear tire. It is understood that the exhaust outlet could be in line with the rear tire or even behind the rear tire. However, the exhaust outlet should always be a distance 56 from the distal end 50 of the diffuser 38 to take advantage of both increased thrust and increased downforce.

Figure 9:
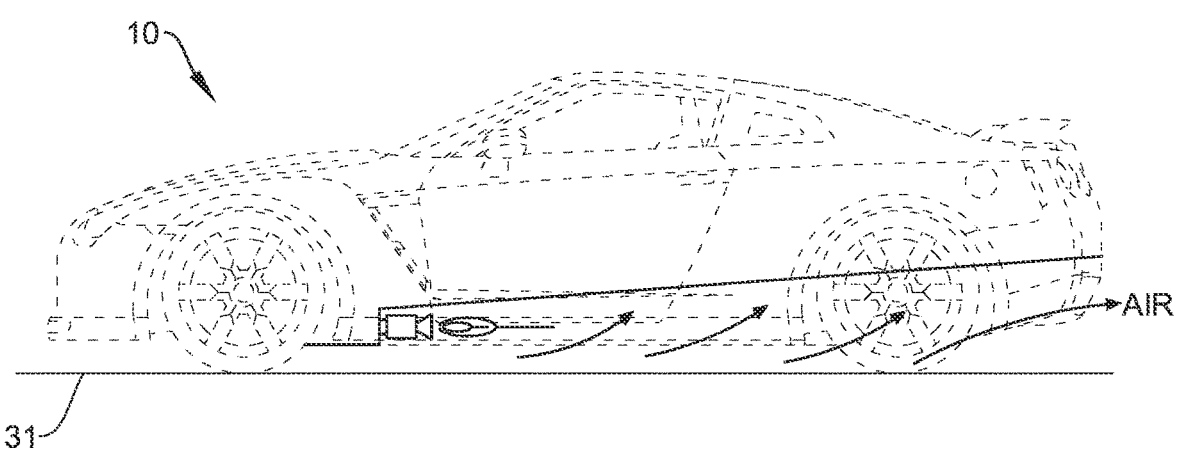
FIG. 9 is an embodiment of the present invention of a thruster working in cooperation with the diffuser for increased performance.

FIG. 9 shows another embodiment wherein the exhaust outlet is disposed ahead of the vertical cross plane. In this embodiment, the exhaust outlet is disposed ahead of the at least one rear tire and behind the pair of steerable front wheels.

Figure 10:
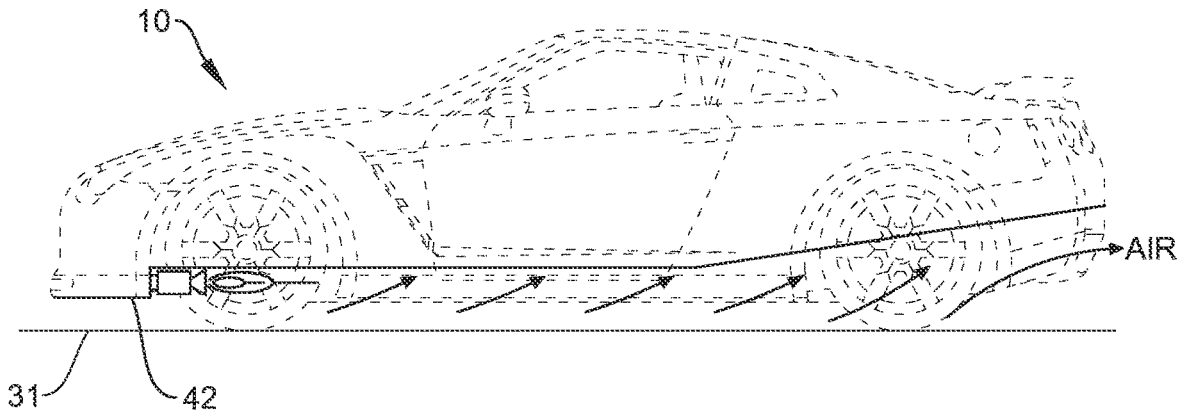
FIG. 10 is an embodiment of the present invention of a thruster working in cooperation with the diffuser for increased performance.

FIG. 10 shows another embodiment wherein the exhaust outlet is disposed ahead of the pair of steerable front wheels.

It is understood by those skilled in the art that the exhaust outlet can be disposed anywhere along the length of the vehicle as long as there is enough distance 56 such that additional downforce can be generated in combination with the diffuser.

If a hot gas thruster or turbine engine is used, the diffuser could include a heat resistant coating or heat shield disposed on at least one external surface of the diffuser. This would protect the rest of the diffuser from being melted or catch on fire.

Figure 11:
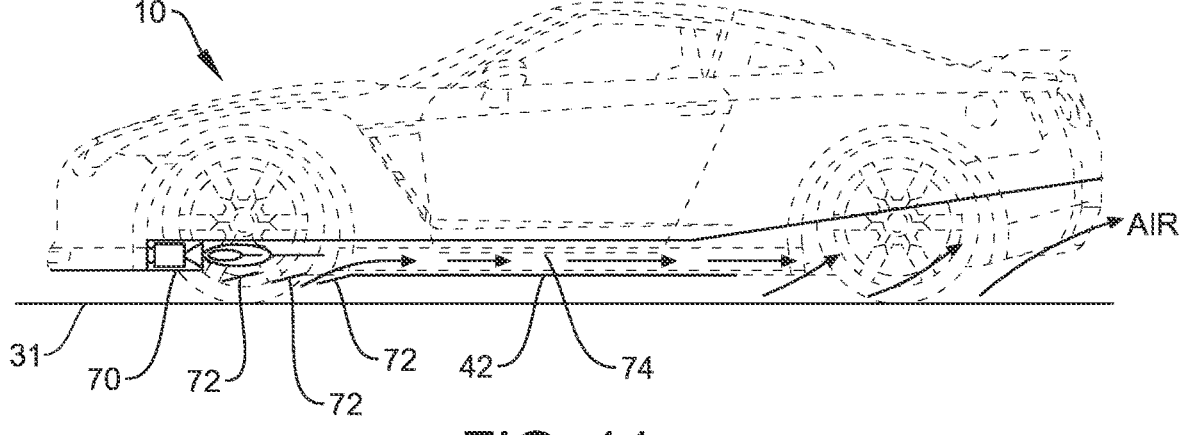
FIG. 11 is an embodiment of the present invention of a thruster working in cooperation with the diffuser for increased performance.

FIG. 11 shows an embodiment where the exhaust is placed near the front of the vehicle but then a floor 42 of the car captures the airstream 58 within a channel 74. Air scoops 72 help bring in colder air to then make a mixed stream of air that is not too hot as it travels within the flooring of the vehicle.

While only one thruster is shown, it is understood that multiple thrusters could be utilized. For example, one thruster could be disposed within a left side diffuser and a second thruster could be disposed within a right side diffuser. Accordingly, a plurality of thrusters could be utilized from 1 to any "n" number of thrusters.

As can be understood from this teaching, a multitude of different diffuser designs incorporating a thruster are now possible in light of the invention herein.

What is claimed is:

1. A wheeled vehicle, comprising:

a frame configured for supporting a driver and/or a plurality of mechanical devices, wherein the frame is defined as having a front portion, a rear portion, a vertical cross plane, a right portion, a left portion, and a vertical center plane, wherein the front portion is opposite the rear portion and is generally divided by the vertical cross plane, and wherein the right portion is opposite the left portion and is generally divided by the vertical center plane;

a pair of steerable front wheels rotatably affixed to the frame positioned at opposite sides of the front portion generally equally separated by the vertical center plane, and wherein the pair of steerable front wheels rotate in both a pair of rolling axes and a pair of turning axes, wherein the pair of rolling axes allow the pair of steerable front wheels to roll upon a surface wherein the surface is substantially perpendicular to both the vertical center plane and the vertical cross plane, wherein the pair of rolling axes are substantially parallel with the surface, and wherein the pair of turning axes are substantially parallel to both the vertical center plane and the vertical cross plane, wherein the driver and/or the plurality of mechanical devices are configured to change direction of the pair of steerable front wheels relative to the orientation of the frame about the pair of turning axes through a steering input;

at least one rear wheel rotatably affixed to the frame generally positioned about the rear portion behind the vertical cross plane, wherein the at least one rear wheel rotates in a rear rolling axis wherein the rear rolling axis is substantially parallel to the vertical cross plane and substantially perpendicular to the vertical center plane, such that the rear wheel can roll upon the surface;

a motor affixed to the frame configured to power at least one of the pair of steerable front wheels and/or the at least one rear wheel;

a diffuser affixed directly or indirectly to the frame or formed as part of the frame, the diffuser defining a tunnel-shaped void disposed at a bottom of the vehicle and open to the surface, the tunnel starting at a proximal end with a first height nearer to the front portion and increasing to a second height closer to the rear portion, wherein a distal end of the diffuser is open to the rear portion; and a thruster affixed directly or indirectly to the frame, the thruster having an exhaust outlet, wherein the exhaust outlet is disposed at, near or within the diffuser aimed at the tunnel-shaped void, wherein the exhaust outlet is disposed a distance away from the distal end of the diffuser, wherein the exhaust outlet is configured to introduce a moving airstream into the diffuser thereby increasing downforce of the wheeled vehicle generated by the diffuser while the wheeled vehicle is stationary or moving.

2. The wheeled vehicle of claim 1, wherein the thruster is a cold gas thruster.

3. The wheeled vehicle of claim 2, wherein the cold gas thruster is powered by a compressed gas stored in a pressurized tank.

4. The wheeled vehicle of claim 1, wherein the thruster is a hot gas thruster.

5. The wheeled vehicle of claim 4, wherein the hot gas thruster is powered by a combustible fuel stored in a fuel tank.

6. The wheeled vehicle of claim 1, wherein the thruster is a combustible fuel powered turbine engine.

7. The wheeled vehicle of claim 1, wherein the thruster is an electric motor powered turbine.

8. The wheeled vehicle of claim 7, wherein the electric motor powered turbine is powered by electricity stored in a battery and/or capacitor.

9. The wheeled vehicle of claim 1, wherein the exhaust outlet is disposed ahead of the at least one rear tire.

10. The wheeled vehicle of claim 1, wherein the exhaust outlet is disposed ahead of the pair of steerable front wheels.

11. The wheeled vehicle of claim 1, wherein the exhaust outlet is disposed ahead of the vertical cross plane.

12. The wheeled vehicle of claim 1, wherein the exhaust outlet is disposed ahead of the at least one rear tire and behind the pair of steerable front wheels.

13. The wheeled vehicle of claim 1, wherein the exhaust outlet is aimed directly parallel to the surface.

14. The wheeled vehicle of claim 1, wherein the exhaust outlet is aimed at an angle upwards relative to the surface.

15. The wheeled vehicle of claim 1, including a shield plate disposed below the exhaust outlet and/or the thruster.

16. The wheeled vehicle of claim 1, including a heat resistant coating or heat shield disposed on at least one external surface of the diffuser.

17. The wheeled vehicle of claim 1, wherein the distance of the exhaust outlet from the distal end of the diffuser is at least one foot.

18. The wheeled vehicle of claim 1, wherein the distance of the exhaust outlet from the distal end of the diffuser is at least two feet.

19. The wheeled vehicle of claim 1, wherein the distance of the exhaust outlet from the distal end of the diffuser is at least three feet.

20. The wheeled vehicle of claim 1, wherein the distance of the exhaust outlet from the distal end of the diffuser is at least four feet.

\* \* \* \* \*